(12) United States Patent
Canetti

(10) Patent No.: US 8,570,430 B2
(45) Date of Patent: Oct. 29, 2013

(54) DYNAMIC CAMERA FOCUSING

(75) Inventor: Isaac Canetti, Tel Aviv (IL)

(73) Assignee: Rey. Focusing Systems Ltd., Tel Aviv (IL)

( * ) Notice: Subject to any disclaimer, the term of this patent is extended or adjusted under 35 U.S.C. 154(b) by 371 days.

(21) Appl. No.: 13/062,569

(22) PCT Filed: Jul. 17, 2009

(86) PCT No.: PCT/IB2009/053111
§ 371 (c)(1),
(2), (4) Date: Mar. 7, 2011

(87) PCT Pub. No.: WO2010/026499
PCT Pub. Date: Mar. 11, 2010

(65) Prior Publication Data
US 2011/0169998 A1    Jul. 14, 2011

Related U.S. Application Data

(60) Provisional application No. 61/094,912, filed on Sep. 7, 2008.

(51) Int. Cl.
*H04N 5/232* (2006.01)
*G03B 15/02* (2006.01)
*G03B 13/00* (2006.01)

(52) U.S. Cl.
USPC ............................ 348/348; 396/106; 396/124

(58) Field of Classification Search
USPC .................... 348/345, 348; 356/3.01, 4.01, 8; 396/106–110, 124, 138–143
See application file for complete search history.

(56) References Cited

U.S. PATENT DOCUMENTS

| | | | | |
|---|---|---|---|---|
| 5,677,760 | A | * 10/1997 | Mikami et al. | ............... 356/3.04 |
| 5,900,927 | A | * 5/1999 | Hasegawa | .................... 356/3.13 |
| 6,028,672 | A | 2/2000 | Geng | |
| 7,499,638 | B2 | * 3/2009 | Arai et al. | ...................... 396/108 |
| 2006/0256229 | A1 | * 11/2006 | Wernersson | .................. 348/348 |
| 2007/0091175 | A1 | 4/2007 | Iddan et al. | |

FOREIGN PATENT DOCUMENTS

| | | |
|---|---|---|
| JP | 04-340910 | 11/1992 |
| JP | 05-04075 | 1/1993 |
| JP | 07-019858 | 1/1995 |
| JP | 08-075987 | 3/1996 |
| WO | 2006/120146 | 11/2006 |

OTHER PUBLICATIONS

PCT International Search Report from PCT/IB2009/053111 dated Mar. 4, 2010.
English Translation of Japanese Office Action dated Jun. 25, 2013 for corresponding Japanese Application No. 2011-525649.

* cited by examiner

*Primary Examiner* — Timothy J Henn
(74) *Attorney, Agent, or Firm* — A.C. Entis-IP Ltd.

(57) ABSTRACT

Apparatus for focusing a camera having an optic axis, an optic center and a field of view, to image a scene, the apparatus comprising: an illumination system controllable to illuminate substantially any region of interest (ROI) of the scene in the field of view of the camera with a relatively small fiducial spot of light; a ranging system configured to determine a range for the fiducial spot relative to the camera; and a controller that focuses the camera to a distance responsive to the determined range.

15 Claims, 3 Drawing Sheets

DYNAMIC CAMERA FOCUSING

RELATED APPLICATIONS

The present application is a US National Phase of PCT Application No. PCT/IB2009/053111, filed on Jul. 17, 2009, which claims the benefit under 35 U.S.C. 119(e) of U.S. Provisional Application 61/094,912 filed on Sep. 7, 2008, the disclosure of which is incorporated herein by reference.

FIELD

Embodiments of the invention relate to methods and apparatus for focusing a camera.

BACKGROUND

Whereas, generally, a camera is focused to a point in a scene being imaged by the camera along its optic axis, some cameras enable a user to point the camera in a desired direction, but focus the camera to one of a plurality of off axis focus areas of the scene. Locations of the off axis focal areas are predetermined and fixed relative to the camera's optic axis. When imaging a scene, the camera can be pointed along a direction that provides a desired composition of features in the scene with a given region of interest (ROI) located at one of the fixed off axis focal areas. The focus may then be locked to the off axis focal areas to acquire an image in which the given ROI is in focus for the desired composition. A modern camera may typically be configured with between 3-11, and possibly as many as 51, preset, off axis focusing areas to which the camera focus can be automatically locked.

Various methods and devices are known in the art for focusing a camera whether focusing is preformed for on-axis or off-axis areas in a scene being imaged by the camera. For many cameras focusing is performed responsive to contrast of an image of a scene that the cameras are used to image. Images that are in focus are sharper and show detail more clearly than images that are not in focus. Sharper, in focus images comprise higher spatial frequency components than images that are blurred and out of focus. Typically, focusing a camera on a scene by contrast involves acquiring an image of the scene for each of a plurality of "trial" positions of a focusing lens or lens system of the camera. Each image is sampled and the samples for an image are used to determine spatial frequencies in the image. A trial position of the focusing lens or lens system for which the corresponding image exhibits highest spatial frequencies is considered to be an in focus position of the focusing lens. Focusing by contrast is generally relatively computation intensive and slow. Often, to reduce computational complexity and time to focus, the number of trial positions is reduced and/or sampling is performed with decreased pitch. However, reducing the number of trial positions or sampling pitch, generally reduces accuracy of focusing.

Various triangulation methods and implementing apparatus are also known in the art and used for focusing cameras. In these methods, distance of a scene from a camera is assumed a leg of a right triangle. PCT Publication WO2006120146 describes a triangulation auto focus method and system for focusing a camera in which a "spot beam emitter" marks a scene being imaged by the camera with a spot of light by illuminating the scene along a direction parallel to the camera axis. Displacement of an image of the spot in an image of the scene from a center of the image is used to provide triangulation data for determining distance to the scene.

U.S. Pat. No. 6,028,672 describes a "Rainbow Stereo 3D Camera" that exploits "projected color light with a spatially distributed wavelength spectrum on the surface of objects" in a scene to determine distances to the objects. "Multiple color imaging sensors separated by a baseline distance are used to capture stereo pair images of the scene at camera's frame rate. The 3D depth values are calculated using triangulation . . . ".

US Patent Publication 2007/0091175 describes a gated time of flight camera for determining distances to features in a scene.

The disclosures of all of the above referenced patents and publications are incorporated herein by reference.

SUMMARY OF THE INVENTION

An aspect of some embodiments of the invention relates to providing a system, optionally referred to as an "AccuFocus" system, for focusing a camera, in which an operator of the camera can relatively rapidly focus the camera to a relatively small region of interest (ROI) in a scene being imaged by the camera.

An aspect of some embodiments of the invention relates to providing methods and apparatus for indicating a relatively small ROI in a field of view of a camera and focusing the camera so that the ROI is in focus.

According to an aspect of some embodiments of the invention, ROIs are off axis relative to an optic axis of the camera.

In an embodiment of the invention, a camera AccuFocus system comprises an illumination system that is manually operable to be aimed to substantially any desired ROI in a scene being imaged by the camera and mark the scene with a small spot, referred to as a "fiducial spot", of light. Optionally, the fiducial spot is circular and has a diameter less than about 5 mm. Optionally, the fiducial spot has a diameter less than about 3 mm. In some embodiments of the invention, the fiducial spot has a diameter less than about 2 mm. Optionally, the size of the fiducial spot illuminating an ROI is adjustable. Any of various methods for collimating and/or determining an angular divergence of light that the illumination system provides to illuminate features in a scene with a fiducial spot, may be used in the practice of the invention to determine fiducial spot size.

In some embodiments of the invention the light is IR light. Optionally the light is visible light. Optionally, an image of the scene and fiducial spot are displayed on a suitable visual display so that an operator of the camera can follow where in the scene the fiducial spot is located. The system comprises apparatus for imaging the scene and fiducial spot and processing the image to determine a distance of the camera to the fiducial spot. Distance to the spot of light is used to configure optics comprised in the camera to focus the camera so that the ROI is in focus. For an off axis ROI the distance to the fiducial spot is used to focus the camera optionally to a plane that includes the ROI, and is perpendicular to the camera optical axis.

Any of various methods or combinations of methods for determining distance to a region of a scene may be used to determine distance of the camera to the fiducial spot. For example, in some embodiments of the invention, the camera comprises apparatus for determining distance from the camera to the fiducial spot in accordance with a triangulation algorithm. Optionally, the camera comprises apparatus for determining the distance responsive to contrast. In some embodiments, the camera uses time of flight apparatus and methods to determine the distance. Optionally, a size of a fiducial spot imaged by the AccuFocus system is used to determine distance.

According to an aspect of some embodiments of the invention, the AccuFocus system comprises a manually operable controller for aiming the illumination system and illuminating a desired ROI in a scene being imaged by the camera with a fiducial spot. Optionally, the controller is operable not only to aim the illumination system, but also to control the camera to lock the camera focus to the fiducial spot when it is located on the ROI in the scene, and optionally to also acquire an image of the scene when the camera focus is locked. In some embodiments of the invention the controller comprises a touch screen. In some embodiments of the invention the controller comprises a "roller-ball" that is rotated and/or pressed to respectively aim and/or lock the camera focus.

There is therefore provided in accordance with an embodiment of the invention, apparatus for focusing a camera having an optic axis, an optic center and a field of view, to image a scene, the apparatus comprising: an illumination system controllable to illuminate substantially any region of interest (ROI) of the scene in the field of view of the camera with a relatively small fiducial spot of light; a ranging system configured to determine a range for the fiducial spot relative to the camera; and a controller that focuses the camera to a distance responsive to the determined range.

Optionally, the apparatus comprises a display screen that displays an image of the scene and a location in the scene illuminated by the fiducial spot of light. Additionally or alternatively, the controller is optionally configured to process the range to provide a distance to which to focus the camera that is substantially equal to a scalar product of a vector from the camera optic center to the fiducial spot with a unit vector coincident with the camera optic axis.

In some embodiments of the invention, the apparatus comprises a position sensing device that determines a direction relative to the camera optic axis along which the illumination system illuminates the ROI with the fiducial spot of light.

In some embodiments of the invention, the apparatus comprises a controller, manually operable to aim the illumination system to illuminate a desired ROI in the scene.

Optionally, the controller is operable to control the apparatus to determine the range for the fiducial spot when the ROI is illuminated therewith. Additionally or alternatively, the controller is operable to focus the camera when the range is determined. Optionally, the controller is operable to lock the camera focus.

In some embodiments of the invention, the controller is operable to control the camera to acquire an image of the scene when the camera is focused.

In some embodiments of the invention, the controller comprises a rotatable roller-ball, finger-operated to provide a function of the controller.

In some embodiments of the invention, the controller comprises a touch sensitive screen finger-operated to provide a function of the controller.

In some embodiments of the invention, the size of the fiducial spot of light is determined substantially by diffraction.

In some embodiments of the invention, the fiducial spot of light has a diameter that is less than or about equal to 5 mm. Optionally, the fiducial spot of light has a diameter that is less than or about equal to 3 mm. Optionally, the fiducial spot of light has a diameter that is less than or about equal to 2 mm.

In some embodiments of the invention, the light is visible light. In some embodiments of the invention, the light is non-visible light. Optionally, the light is IR light.

In some embodiments of the invention, the illumination system comprises a laser that illuminates the ROI with the fiducial spot.

In some embodiments of the invention, the ROI is off axis and a direction along which the illumination system illuminates the ROI is not parallel to the camera optic axis.

In some embodiments of the invention, the illumination system encodes light it uses to provide a fiducial spot to distinguish its fiducial spot from a fiducial spot provided by an illumination system of another camera. Optionally, the illumination system frequency encodes light to distinguish its fiducial spot. Optionally, frequency encoding comprises using light at a frequency different from that other camera. Additionally or alternatively, frequency encoding comprises using light pulsed at a repetition frequency different form that of the other camera.

There is further provided in accordance with an embodiment of the invention, a camera comprising an apparatus according to an embodiment of the invention.

There is further provided in accordance with an embodiment of the invention, a method of focusing a camera having an optic axis and optic center to image a scene, the method comprising: illuminating an off axis region of interest in the scene with a relatively small fiducial spot of light; determining a range for the fiducial spot relative to the camera; and focusing the camera responsive to a scalar product of a vector from the camera optic center to the fiducial spot with a unit vector coincident with the camera optic axis.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
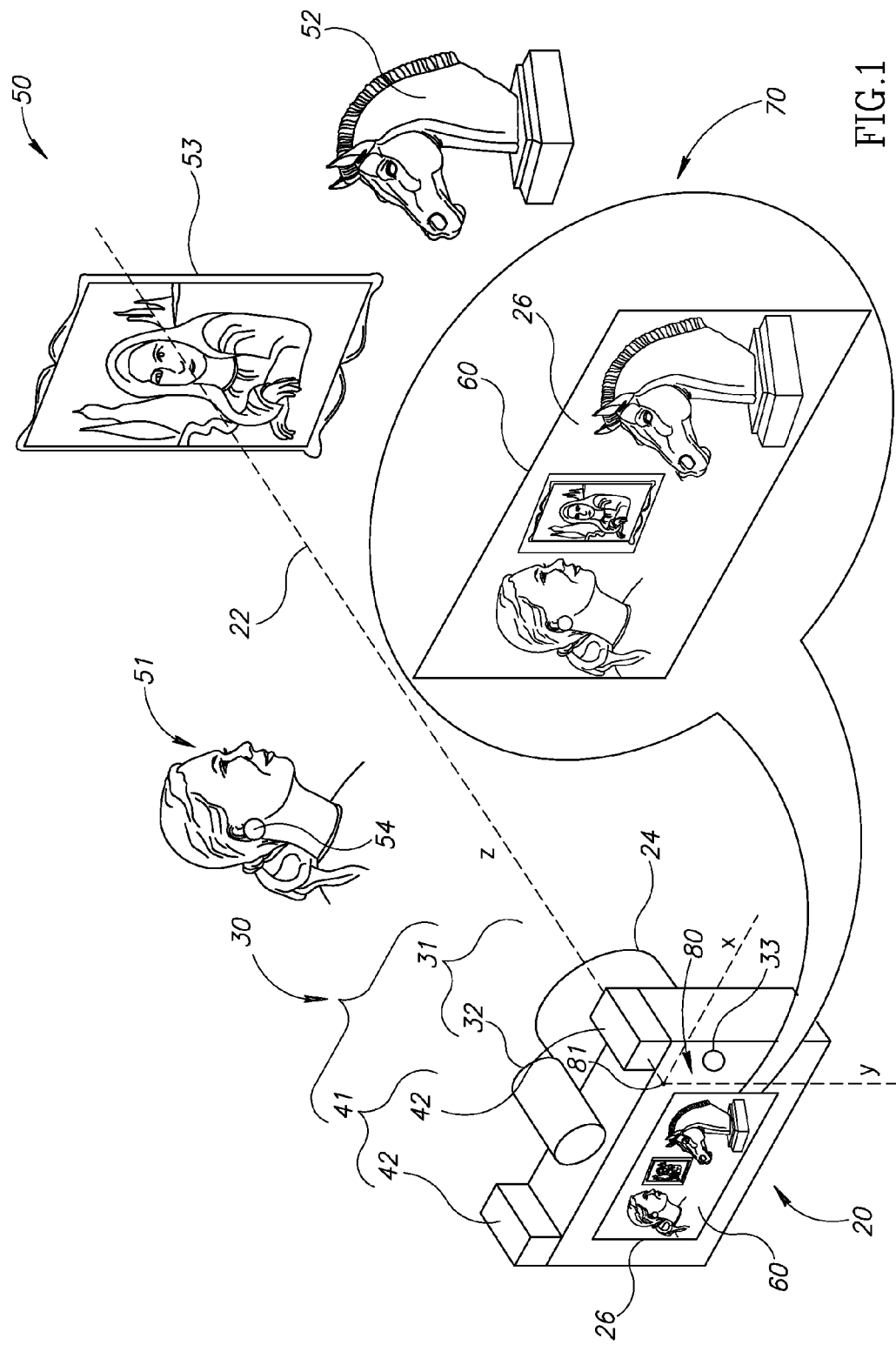
FIG. 1 schematically illustrates a camera comprising an AccuFocus system being used to image a scene, in accordance with an embodiment of the invention.

FIG. 1 schematically illustrates a camera 20 comprising an Accufocus system 30 being used by a photographer (not shown) to acquire an image of a scene 50, in accordance with an embodiment of the invention. AccuFocus 30 comprises an illumination system 31 for marking a region of interest (ROI) in a scene, e.g. scene 50, being imaged by camera 20 with a fiducial spot, and a ranging system 41 for determining a distance to the fiducial spot.

Illumination system 31 is optionally manually operated and comprises a laser 32 controllable to be aimed to illuminate substantially any region in a field of view of camera 20, e.g. any region of interest in scene 50, with a fiducial spot of, optionally, visible light. Optionally, a ball controller, hereinafter "roller-ball" 33 mounted in a socket in camera 20 is used to aim illumination system 31. Roller-ball 33 is manually rotated to optionally aim the laser to a desired ROI of scene 50

Ranging system 41 may comprise any of various ranging systems, such as triangulation, time of flight, and/or contrast ranging systems, and combinations of such systems for determining distance to a fiducial spot when it is marking a desired ROI. Optionally, ranging system 41 comprises a stereoscopic ranging system as shown in the figure, and comprises two imagers 42 that acquire images of scene 50 and the fiducial spot from two different perspectives. The ranging system uses a suitable triangulation algorithm to determine distance, hereinafter also "range", to the fiducial spot from the camera.

It is noted that whereas laser 32 and imagers 42 are schematically shown as separate components mounted to an external surface of the camera housing, it is of course, understood that the laser and/or imager may be internally mounted in camera 20 and may comprise components that are shared with other systems in the camera. For example, at least one of imagers 42 may use a photosurface or portion thereof on which camera 20 images scene 50.

Camera 20 may comprise any of various optical components and systems known in the art and may, for example, have a CCD or CMOS photosurface (not shown), and any suitable lens system for collecting and imaging light from scene 50 on the photosurface and any appropriate mechanism for moving and positioning components of the lens system to focus the camera. Optionally, camera 20 has an optic axis 22 and comprises a bayonet lens mount 24 in which lenses (not shown) for collecting and imaging light from scene 50 are mounted, and a display screen 26 for displaying an image 60 of scene 50. An enlarged image of display screen 26 and image 60 of the scene is shown in an inset 70. In accordance with an embodiment of the invention, the photographer is able to track where in scene 50 he or she aims laser 32 of imaging system 31 to mark an ROI in the scene with a fiducial spot by observing a location of an image of the fiducial spot against a background of image 60 of the scene on display screen 26.

By way of example, scene 50 is being photographed to provide images for use in an advertisement for jewelry, and comprises a woman 51 in a museum setting who is admiring a sculpture 52 of a horse. In the background a painting 53 is on a wall behind sculpture 52. The woman is wearing an earring 54, which is a particular region of interest (ROI) in the scene, and camera 20 is to be focused to provide a clear "upscale" advertising image of the earring against a "classical" background of the woman and the sculpture.

In FIG. 1, the photographer has aimed camera 20 so that optic axis 22 of the camera points to a region in scene 50 between the woman 51 and sculpture 52 and intersects painting 53. The direction in which the camera is pointed includes the sculpture and picture in the camera's field of view, and provides a desired upscale composition of the woman in a museum setting. For convenience of presentation, distances and directions are referred to a coordinate system 80 having an origin of coordinates assumed to lie at an optic center 81 of the camera, and for which optic axis 22 of camera 20 is coincident with the z-axis.

Figure 2:
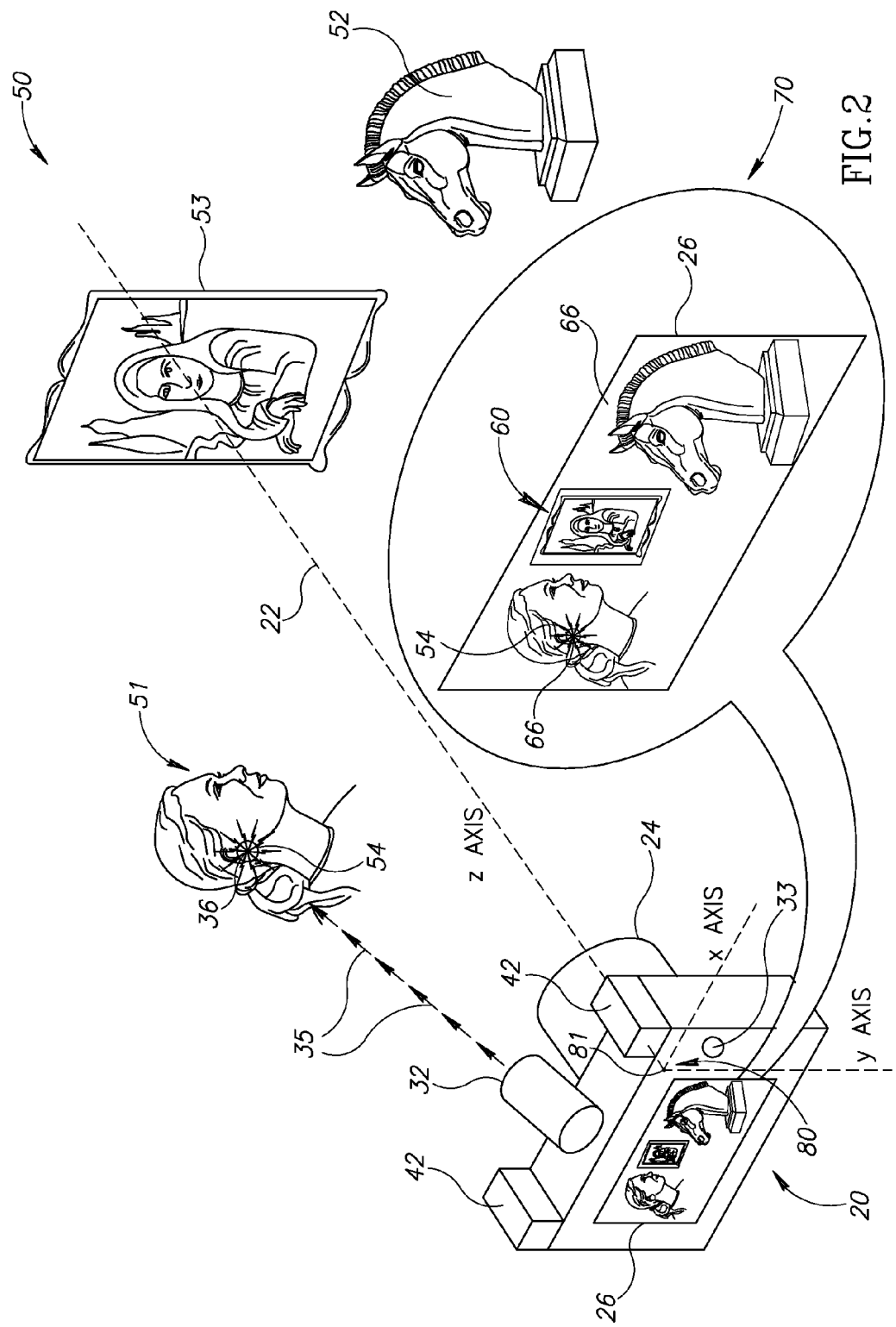
FIG. 2 schematically illustrates the AccuFocus system shown in FIG. 1 aimed to a particular ROI in the scene to focus the camera, in accordance with an embodiment of the invention.

FIG. 2. schematically shows Accufocus 30 after the photographer has aimed the AccuFocus illumination system 31 to illuminate earring 54 with light indicated by arrows 35 and provide a fiducial spot, indicated by a starburst 36, of light on earring 54. An image 66 of fiducial spot 36 shown on display screen 26 indicates to the photographer where fiducial spot 36 is located and that it is properly positioned on the earring.

Once the photographer is satisfied that fiducial spot 36 is properly located on earring 54 of the woman in scene 50, the photographer controls AccuFocus 30 to focus camera 20 on scene 50 responsive to range to the fiducial spot determined by ranging system 32. Optionally, the photographer controls AccuFocus 30 to focus camera 20 and acquire an image of scene 50 using roller-ball 33. For example, following rotation of roller-ball 33 to aim laser 32 at earring 54, pressure on the roller-ball while it is kept stationary optionally signals the camera optical system to focus at the distance determined by ranging system 41. Sustained pressure on the roller-ball for a predetermined period after the camera has determined distance to focal spot 36 and focused the camera subsequently controls the camera to acquire an image of the scene.

In accordance with an embodiment of the invention, if illumination system 31 generates fiducial spot 36 in light to which the photosurface in camera 20 on which scene 50 is imaged is sensitive, illumination system 31 is turned off during acquisition of the image of scene 50. If on the other hand, in accordance with an embodiment of the invention illumination system 31 generates fiducial spot 36 with light to which the photosurface on which the scene is imaged is not sensitive, the illumination system is optionally not turned off during acquisition of an image of scene 50

For example, the photosurface on which the image of scene 50 is formed may be filtered to block IR light and illumination system 31 optionally generates fiducial spot 36 with IR light. To indicate to the photographer where he or she is aiming illumination system 31, focal spot 36 is imaged on an IR sensitive photosurface (not shown) registered to the IR insensitive photosurface on which scene 50 is imaged. The image of the fiducial spot generated by the IR photosurface is superimposed on the image of scene 50 exhibited on screen 26 to indicate to the photographer where the focal spot is aimed.

Figure 3:
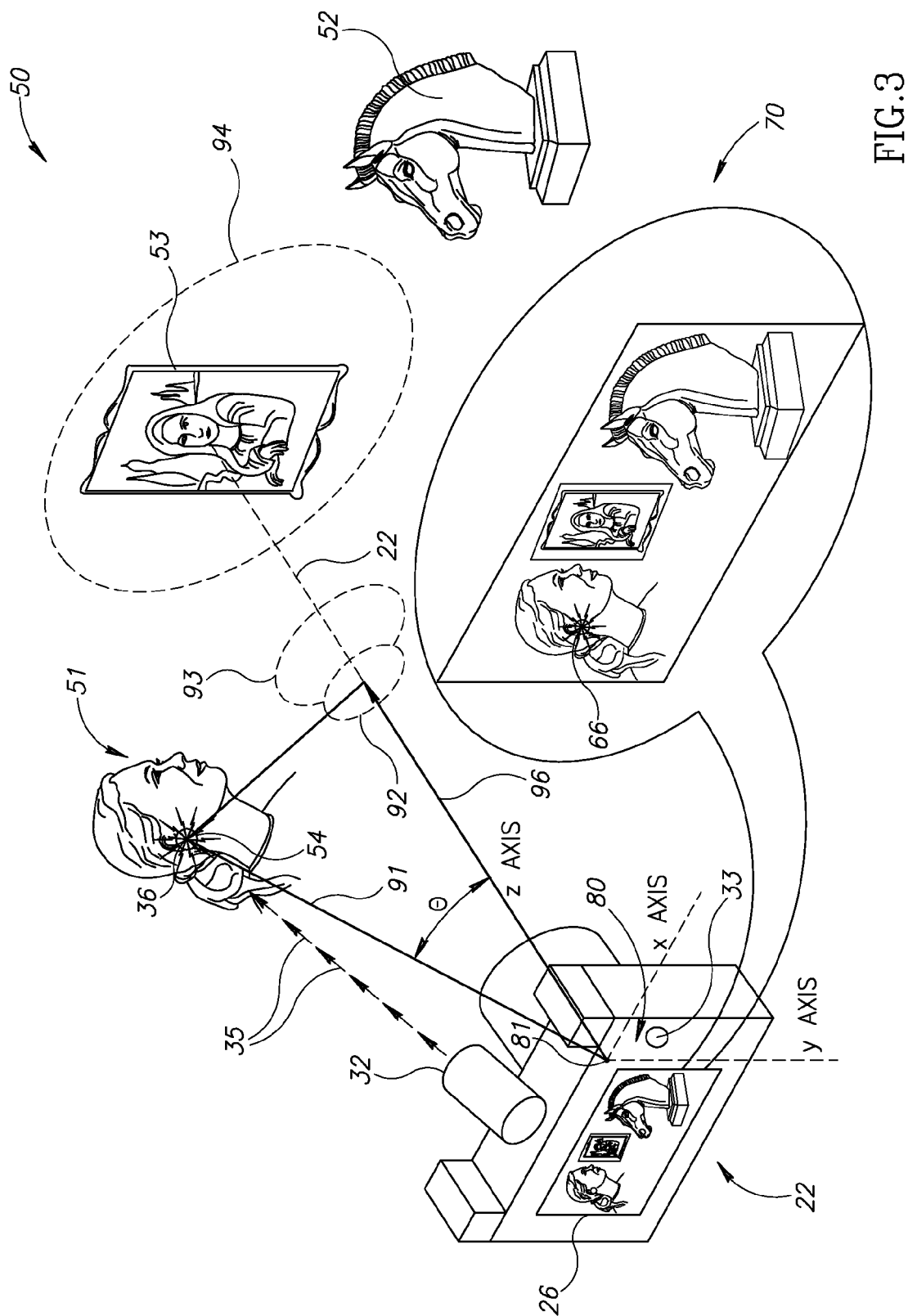
FIG. 3 schematically illustrates a method by which Accufocus determines a distance at which to focus the camera, in accordance with an embodiment of the invention.

FIG. 3 schematically illustrates a method by which AccuFocus 30 determines a distance at which to focus camera 20 responsive to a range determined for focal spot 36 by ranging system 31, in accordance with an embodiment of the invention. Fiducial spot 36 provided by illumination system 31 on earring 54 lies at an end of a spatial vector 91 having a direction angle θ relative to the z-axis and a length "R". In an embodiment of the invention, AccuFocus 30 determines that camera 20 is focused to a plane that includes fiducial spot 36 marking earring 54 that is perpendicular to optic axis 22. The plane perpendicular to optic axis 22 including fiducial spot 36 is schematically indicated by a dashed circle 92. For convenience of presentation, planes associated with sculpture 52 and painting 53, which are displaced farther from camera 20 than plane 92 containing fiducial spot 36, are represented by dashed circles 93 and 94 respectively.

Plane 92 is located at a distance from optic center 81 that is equal to a scalar product, i.e. a dot product, of spatial vector 91 with a unit vector coincident with optic axis 22. If the distance from optic center 81 to plane 92 is represented by a spatial vector 96 having length DF, then DF=R cos θ, where as noted above R is the length of vector 91.

Direction angle θ is optionally determined responsive to a position of an image of fiducial spot 36 on a photosurface that images the fiducial spot. For example, if fiducial spot 36 is imaged on a same photosurface on which scene 50 is imaged, a line from the fiducial spot image to optic center 81 of camera 20 makes an angle θ with the camera optic axis 22. The angle θ can of course be determined from location of an image of the fiducial spot on a photosurface of camera 20 other than a photosurface on which scene 50 is image and given suitable geometrical relationships between the photosurfaces. The fiducial spot image is recognized, and thereby its location on the photosurface, and the angle θ, are optionally determined using a pattern recognition algorithm.

In some embodiments of the invention light provided by illumination system 31 is coded by the illumination system so that fiducial spots provided by different cameras are distinguishable. Photographers simultaneously imaging a same scene with different cameras can thereby focus their respective cameras using fiducial spots without interference from fiducial spots provided by cameras of the other photographer or photographers.

For example, in some embodiments of the invention, illumination systems such as illumination system 31, in different cameras generate fiducial spots 36 using light of different frequencies. Different cameras are sensitive to light for imaging fiducial spots at wavelengths used by from their own illumination systems but not at wavelengths form other cameras. Optionally, light provided, by illumination systems 31 in different cameras, in accordance with an embodiment of the invention, produce fiducial spots with pulses of light provided at different repetition frequencies to distinguish fiducial light spots. A camera determines if a fiducial light spot is its own by monitoring its repetition frequency.

In accordance with an embodiment of the invention, direction angle θ is determined relative to coordinate system 80 responsive to signals provided by a suitable position sensing device (not shown). Optionally, the position sensing device monitors motion of laser 32 relative to the z-axis of the coordinate system and/or motion of roller-ball 33 in its socket. Optionally, to improve accuracy with which AccuFocus 30 determines position of laser 32, and to reduce error due to component drift and temperature change, AccuFocus 30 is periodically, automatically or selectively, calibrated. Calibration may, by way of example, comprise imaging fiducial spots on the photosurface of camera 20 for different positions of laser 32 and determining from a map of the images, for which positions of the laser, fiducial spots lie along optic axis 22 (i.e. the z-axis).

It is noted that there are no features in scene 50 along optic axis 22 in a plane perpendicular to the optic axis that contains, or is close to, earring 54 (as noted above, sculpture 52 and picture 53 are displaced the z-axis at larger z-coordinates than plane 92 containing fiducial spot 36 relative to a z-coordinate of earring 54). Therefore, were focusing for earring 54 attempted along a direction of optic axis 22, it would, in general, be substantially flawed. Were focusing attempted for earring 54 using conventional fixed focus areas, the earring might not be properly centered on a fixed focus area for a desired composition, such as shown in FIGS. 1-3, of scene 50. For such situations, a photographer often directs camera 20 away from a direction providing the desired composition to center a focal area on the ROI, e.g. 54, and lock the focus. After locking focus, the photographer reorients the camera in the direction that provides the desired composition and acquires an image. However, the reorientation of the camera direction generally displaces the ROI from the focal distance and degrades an image of the ROI. It is also noted that using conventional fixed focus areas, focusing would tend to be dependent on features of scene 50 other than caning 54 that are included in a region of the scene around the caning. Dependence on these other features could result in poor focus and require repeated trial and error adjustments of the camera to achieve acceptable focus.

Whereas in FIGS. 1-3 and in discussion thereof. Accufocus 30 is indicated as comprising a stereoscopic ranging system 41 comprising two imagers, as noted above practice of the present invention is not limited to use of stereoscopic range systems. By way of another example, Accufocus 30 optionally comprises a time of flight ranging system. In the time of flight ranging system, illumination system 31 optionally provides a train of light pulses to generate fiducial spot 36 and light from the focal spot is registered on a single light sensitive detector. Time of flight of light in the pulses from illumination system 31 to the fiducial spot and back to the detector is used to determine distance to the fiducial spot. Optionally, the time of flight ranging system is similar to that described in US Patent Publication 2007/0091175 referenced above.

By way of yet another example, Accufocus 30 may comprise a triangulation ranging system similar to that described in WO2006120146 cited above. However, whereas WO2006120146 requires a spot emitter to generate a spot along a direction parallel to the optic axis of a camera, in accordance with an embodiment of the present invention, illumination system 31 generates a fiducial spot along directions that are not necessarily parallel to the optic axis of camera 20. Optionally, a detector that images focal spot 36 has an optic axis that is controlled to move together with motion of a direction along which illumination system 31 illuminates a scene so that the detector optic axis is parallel to the illumination direction of illumination system 31 when fiducial spot marks a desired ROI. Distance between the parallel illumination direction and detector optic axis and displacement of an image of the fiducial spot in an image provided by the detector from a center of the image is used to provide triangulation data for determining distance to the fiducial spot.

In some embodiments of the invention, AccuFocus 30 focuses camera 20 responsive to fiducial spot 36 marking a desired ROI using contrast. However, in accordance with an embodiment of the present invention, a region for which contrast is determined is restricted to a relatively small portion of the field of view of camera 20 that contains fiducial spot 36. It is therefore expected that focusing camera 20 to an ROI containing fiducial spot 36 using contrast, in accordance with an embodiment of the invention, can be accomplished in a relatively short period of time compared to time required to focus a camera using conventional contrast techniques. Optionally, a region surrounding fiducial spot 36 for which contrast for focusing is determined is indicated on display screen 26 by a shaded circle surrounding the fiducial spot presented on the display screen. Optionally, the photographer can adjust the size of the portion of the camera field of view for which contrast for focusing is determined.

In the description and claims of the application, each of the words "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. Apparatus for focusing a camera having an optic axis, an optic center and a field of view, to image a scene, the apparatus comprising:
    an illumination system controllable to illuminate substantially any region of interest (ROI) of the scene in the field of view of the camera with a fiducial spot of light;
    a position sensing device that determines a direction relative to the camera optic axis along which the illumination system illuminates the ROI with the fiducial spot of light;

a ranging system configured to determine a range for the fiducial spot relative to the camera; and a controller that focuses the camera to a distance responsive to the determined range.

2. Apparatus according to claim 1 comprising a display screen that displays an image of the scene and a location in the scene illuminated by the fiducial spot of light.

3. Apparatus according to claim 1 wherein the controller is configured to process the range to provide a distance to which to focus the camera that is substantially equal to a scalar product of a vector from the camera optic center to the fiducial spot with a unit vector coincident with the camera optic axis.

4. Apparatus according to claim 1 and comprising a controller, manually operable to aim the illumination system to illuminate a desired ROI in the scene.

5. Apparatus according to claim 4 wherein the manually operable controller is operable to control the apparatus to determine the range for the fiducial spot when the ROI is illuminated therewith.

6. Apparatus according to claim 4 wherein the manually operable controller is operable to focus the camera when the range is determined.

7. Apparatus according to claim 6 wherein the manually operable controller is operable to lock the camera focus.

8. Apparatus according to claim 4 wherein the manually operable controller is operable to control the camera to acquire an image of the scene when the camera is focused.

9. Apparatus according to claim 4 wherein the controller comprises a rotatable roller-ball, finger-operated to provide a function of the controller.

10. Apparatus according to claim 4 wherein the controller comprises a touch sensitive screen finger-operated to provide a function of the controller.

11. Apparatus according to claim 1 wherein the light is non-visible light.

12. Apparatus according to claim 1 wherein a direction along which the illumination system illuminates the ROI is not parallel to the camera optic axis.

13. Apparatus according to claim 1 wherein the illumination system encodes light it uses to provide a fiducial spot to distinguish its fiducial spot from a fiducial spot provided by an illumination system of another camera.

14. A camera comprising an apparatus according to claim 1.

15. A method of focusing a camera having an optic axis and optic center to image a scene, the method comprising:

illuminating an off axis region of interest in the scene with a relatively small fiducial spot of light;

determining a range for the fiducial spot relative to the camera; and focusing the camera responsive to a scalar product of a vector from the camera optic center to the fiducial spot with a unit vector coincident with the camera optic axis.

* * * * *